United States Patent [19]

Schmidt

[11] Patent Number: 6,018,668
[45] Date of Patent: Jan. 25, 2000

[54] METHOD FOR AUTO ANSWERING A CALL BASED ON CALLER ID

[75] Inventor: Paul Schmidt, Lynchburg, Va.

[73] Assignee: Ericsson Inc., Research Triangle Park, N.C.

[21] Appl. No.: 08/964,215

[22] Filed: Nov. 4, 1997

[51] Int. Cl.[7] .................................................. H04B 7/00
[52] U.S. Cl. ......................... 455/518; 455/426; 455/445
[58] Field of Search .................................... 455/414, 415, 455/518, 519, 445, 426, 517, 520, 416, 417, 424, 425, 435, 515, 521, 524, 526; 379/142, 157, 158

[56] References Cited

U.S. PATENT DOCUMENTS

| | | | |
|---|---|---|---|
| 4,680,785 | 7/1987 | Akiyama et al. | 455/415 |
| 5,063,588 | 11/1991 | Patsiokas et al. | 455/415 |
| 5,452,474 | 9/1995 | Kagawa | 455/415 |
| 5,457,809 | 10/1995 | Ohnishi | 455/518 |
| 5,548,636 | 8/1996 | Bannister et al. | 455/414 |
| 5,550,905 | 8/1996 | Silverman | 379/142 |
| 5,570,413 | 10/1996 | Ahlberg et al. | 455/569 |
| 5,572,576 | 11/1996 | Klausner et al. | 455/415 |
| 5,710,978 | 1/1998 | Swit | 455/518 |
| 5,764,730 | 6/1998 | Rabe et al. | 455/515 |
| 5,787,157 | 7/1998 | Garfin et al. | 455/415 |
| 5,790,956 | 8/1998 | Lo et al. | 455/518 |
| 5,889,844 | 3/1999 | Kim et al. | 455/519 |
| 5,924,041 | 7/1999 | Alperovich et al. | 455/519 |

FOREIGN PATENT DOCUMENTS

| | | |
|---|---|---|
| 0 727 914 | 8/1996 | European Pat. Off. . |
| 0 771 126 | 5/1997 | European Pat. Off. . |
| WO 96 31073 | 10/1996 | WIPO . |

*Primary Examiner*—Doris H. To
*Attorney, Agent, or Firm*—Nixon & Vanderhye P.C.

[57] ABSTRACT

An auto answer cellular phone system is described in which the caller ID field of an originating cellular page message is modified to be a group ID number designating a plurality of cellular phones within a group. In an example embodiment, an originating phone dials a group phone number, the group phone number is routed to a group ID server by the mobile radio switch. The group ID server looks up the group number in a lookup-table to determine which cellular phones are included in the particular group and then forwards the individual group members ID codes to the switch for connection to the originating phone. Before sending the group members' ID codes to the switch, the group ID server 21 replaces the caller ID field from the originating phone ID to the group number ID. This tells the mobile stations that the call is a group call, as opposed to an individual call and forces the mobile stations into an auto-answer mode such that the mobile station then acts as a dispatch radio, as opposed to a human-answer cellular phone.

14 Claims, 5 Drawing Sheets

| MSID GROUP NUMBER | MSID GROUP MEMBERS | LAND-LINE (GROUP MEMBERS) |
|---|---|---|
| 10 | 2,3,4 | 5 |
| 11 | 2,7,8 | |
| 12 | 5,6,7 | |
| 13 | 5,9 | |
| . | | |
| . | | |
| . | | |

| EEPROM OF MS | |
|---|---|
| ADDRESS 1 | GROUP NO. |
| ADDRESS 2 | GROUP NO. |
| 3 | GROUP NO. |
| 4 | GROUP NO. |
| 5 | GROUP NO. |
| 6 | GROUP NO. |
| 8 | GROUP NO. |
| 9 | GROUP NO. |
| 10 | GROUP NO. |
| 11 | |
| 12 | |
| . | . |
| . | . |
| . | . |

Rows ADDRESS 1 through 10: AUTO ANSWER GROUP IDs.
Rows 11 onward: PRE-STORED (SPEED DIAL) NUMBERS

*Fig. 6*

METHOD FOR AUTO ANSWERING A CALL BASED ON CALLER ID

FIELD OF THE INVENTION

The invention relates to telecommunications networks, and more particularly, to automatically answering calls to cellular telephone mobile stations.

BACKGROUND OF THE INVENTION

The operation of cellular mobile stations (cellular telephones, for example) is fairly well known. As those who have used cellular telephones understand, the cellular telephone system allows users greater mobility while maintaining access to the cellular and public telephone systems. With this mobility, one feature that has become increasingly popular among cellular mobile station users is the ability to operate the cellular telephone in a so-called hands-free environment. That is, ideally the cellular telephone user wishes to be able to answer incoming calls, for example, without touching the mobile station.

Presently, auto answer functions in cellular mobile stations exist. For many mobile stations, for example, auto answer functions exist by adding accessories to the mobile station and enabling the auto answering by mobile station via various feature menus.

A general understanding of the operation of a cellular telephone network is relevant to an appreciation of how the present invention utilizing auto answering in a unique environment. As background, FIGS. 1 and 2 illustrate, respectively, simplified versions of the structures employed in placing a call from a cellular mobile station (FIG. 1) and receiving a call at a cellular mobile station (FIG. 2).

In FIG. 1, the cellular mobile station 10 broadcasts a call request which is received at a base station 11. The base station 11 passes the request to base station controller 12, which communicates the message, including the destination phone number, to the mobile station switch controller 13. The mobile station switch controller 13 has as its principal function the switching of cellular telephone calls to other appropriate base stations (for cellular destination calls) or the public service telephone network 15 (for public telephone destination calls). The mobile station switching center 13 employs visiting location register 14 to register the broadcast location of cellular phone 10. If the mobile station switching center 13 determines that the cellular telephone 10 is authorized to place the phone call requested, it establishes a channel between the cellular mobile station 10 and the destination station (either cellular or PSTN, etc.) when the person receiving the call answers.

FIG. 2 illustrates the reverse of FIG. 1, that is when a call is made to the cellular mobile station 10 as the destination number. In this instance, the originating phone is in PSTN 15, which switches the call request to ground mobile station switch center 17. GMSC 17 locates the home location of the destination mobile station (in this case cellular mobile station 10) from a home location register 16. GMSC 17 then sends the call request with the home location of the mobile station 10 to the mobile station switching center 13. Switching center 13 then switches the call through base station controller 12 servicing the base station 11 in the geographic cell location of the mobile station 10. When the mobile station 10 answers, the connection channel is established and the conversation can begin.

With respect to the embodiment of FIG. 2, the connection between the telephone and the PSTN 15 and the cellular mobile station 10 will not be completed until the user of the cellular mobile station 10 answers the call (usually by hitting a button on the face of the cellular telephone 10). The mobile station 10 can employ features that would permit it to auto answer these phone calls.

A feature that is also currently available is the so-called "caller-id" feature which identifies to the cellular phone user who originated an incoming call. The destination cellular phone learns of the originators' identity through a caller-id field (containing the originator's phone identifier) which is sent to the destination phone in a call request page.

SUMMARY OF THE INVENTION

The present invention utilizes the caller id functionality currently employed in the cellular telephone network to determine whether a cellular mobile station should auto answer a phone call and thereby establish a dispatch radio-type use of the cellular phone system. In one embodiment, if a caller id sent by a base station to a cellular mobile station matches a stored list in the mobile station, the phone will auto answer the call by ringing once, sending a call accept message to the base station, and answering the call, without any user action by the mobile station user. In another embodiment, the caller id is replaced with a group call number which can be identified as such by the destination cellular phones to allow them to be employed in much the same way as dispatch radios. That is, for example, dispatch radios are used by police, etc., to permit a broadcast communication to be sent over a group of radios. According to the present approach, by using the caller id function in the cellular radio, messages can be sent from a dispatch (or from a single cellular radio) to a group of cellular phones, which will then auto answer the calls and broadcast the message to the mobile station user without the need for answering the call to the mobile station. In this way, the cellular telephones can be used as dispatch radios in a hands-free operation.

BRIEF DESCRIPTION OF THE DRAWINGS

Other advantages and objects of the present invention will be described in detail with reference to the accompanying drawings, in which:

FIG. 6 is an example memory table employed by the mobile stations of the example of FIG. 3.

DETAILED DESCRIPTION OF THE INVENTION

In accordance with an example embodiment of the present invention, the cellular radios can be employed in a dispatch radio-type mode by adding group call functions to the cellular system in combination with auto answering functions at the cellular telephones. According to the preferred embodiment, the mobile stations are configured to read caller id information in call requests that it receives from its base station and then checks the caller id information against a stored auto answer phone list. If a match is found, the mobile station auto answers the call without user input and mutes the microphone of the mobile station, such that the mobile station acts as a recipient dispatch radio. The user of the cellular telephone is then able to hear the broadcast message from the dispatching station (or dispatching cellular phone) by hands-free operation. In an alternative embodiment, the user can interrupt the broadcast and speak into the cellular phone by pressing a "push-to-talk" button associated with the mobile station, which will unmute the microphone on the cellular phone and permit the phone to be used in a normal duplex mode.

The present invention is equally applicable to land-line phones such that examples below relating to cellular phones can be easily substituted by land-line phones and remain within the scope of the invention.

Figure 1:
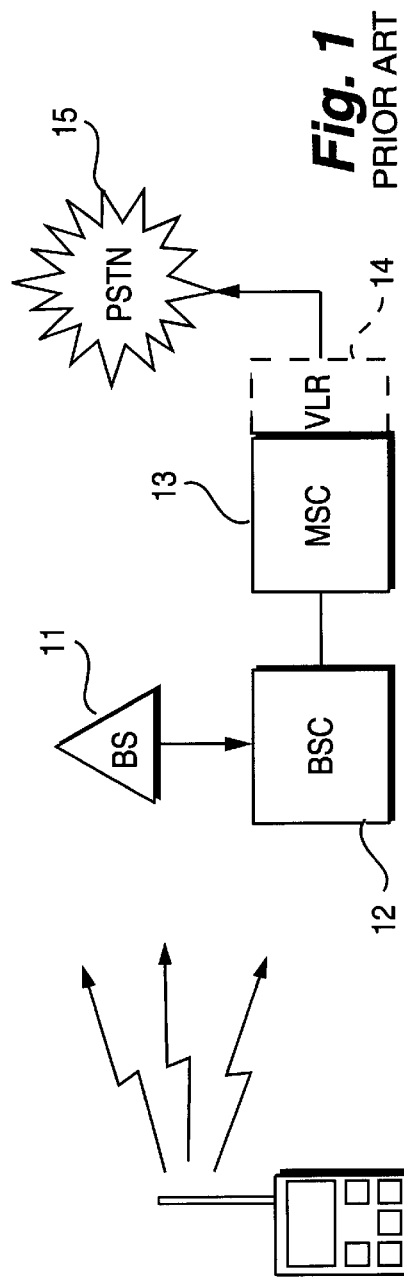
FIG. 1 is a schematic diagram of a standard cellular network system.
Figure 2:
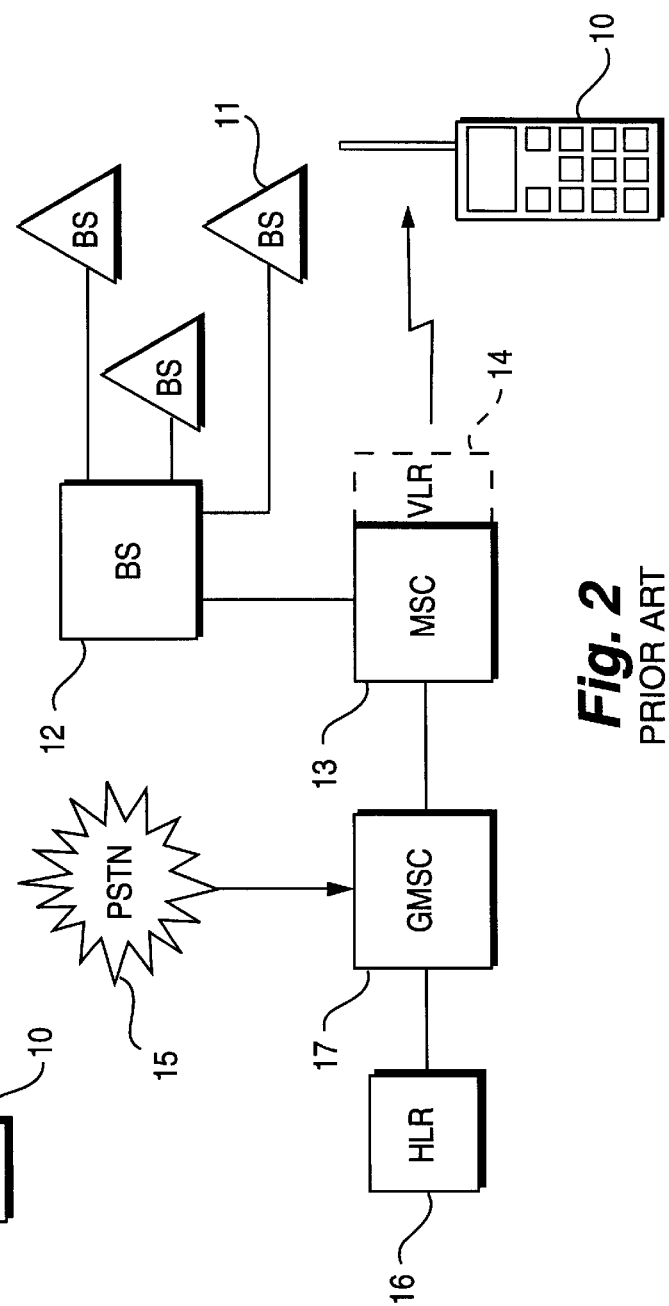
FIG. 2 is another schematic diagram of a standard cellular network system.
Figure 3:
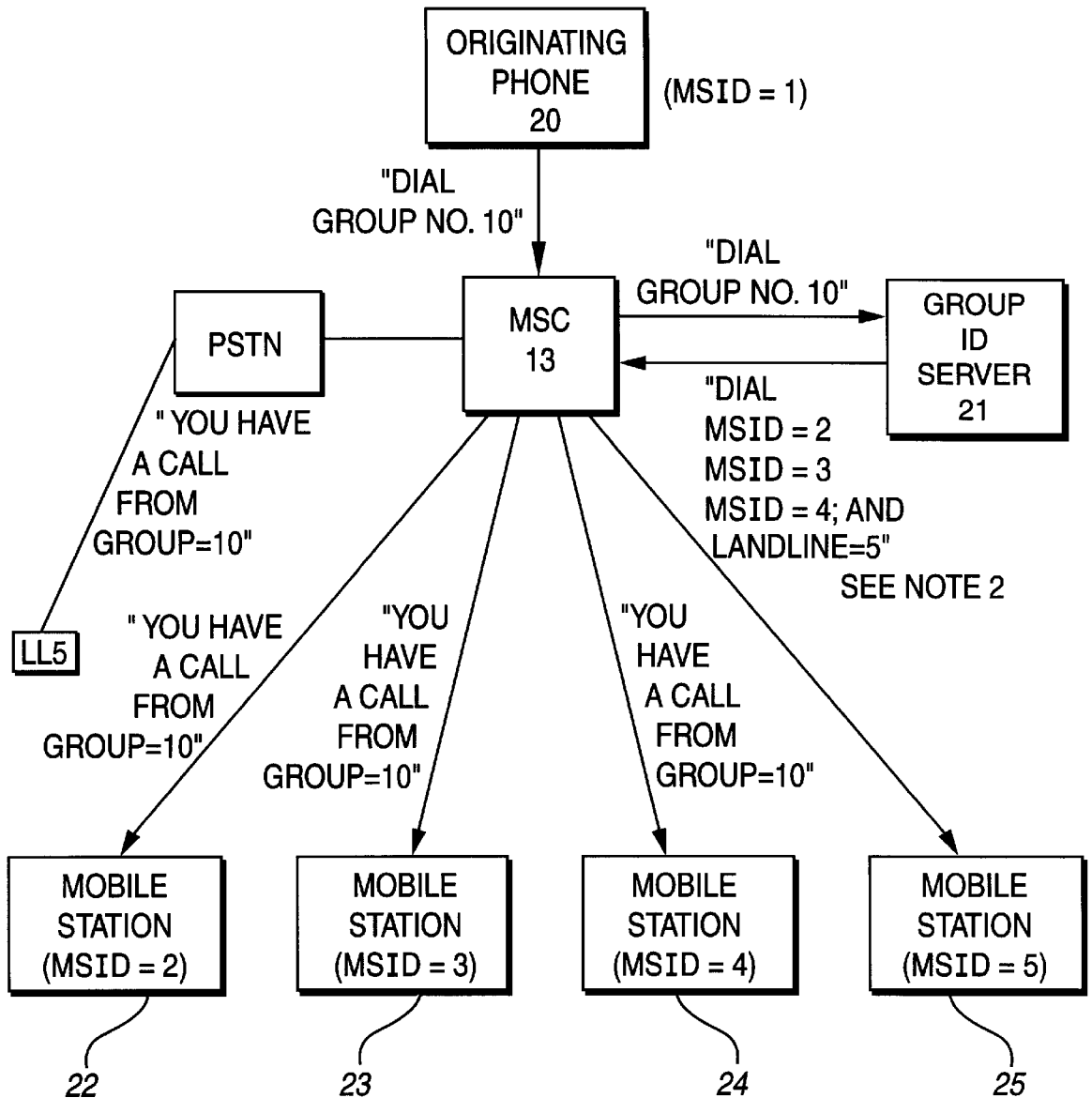
FIG. 3 is a schematic block diagram of an example embodiment of the present invention.

In the cellular example embodiments, the present invention involves several modifications to existing mobile stations and cellular phone network. FIG. 3 illustrates some of these modifications employed in the example embodiment of the present invention. The embodiment of FIG. 3 is centered around the mobile station switching center 13, which operates generally as described with respect to FIGS. 1 and 2 with a few modifications. Although all of the structures shown in FIGS. 1 and 2 as background structures for sending and receiving calls on the cellular network are not shown in FIG. 3, the artisan will understand that such structures (such as base stations, etc.) are to be incorporated in the structure shown in FIG. 3. For simplicity and brevity, structures unnecessary to understanding the example embodiment of the invention shown in FIG. 3 have been omitted.

Figures 4, 5:
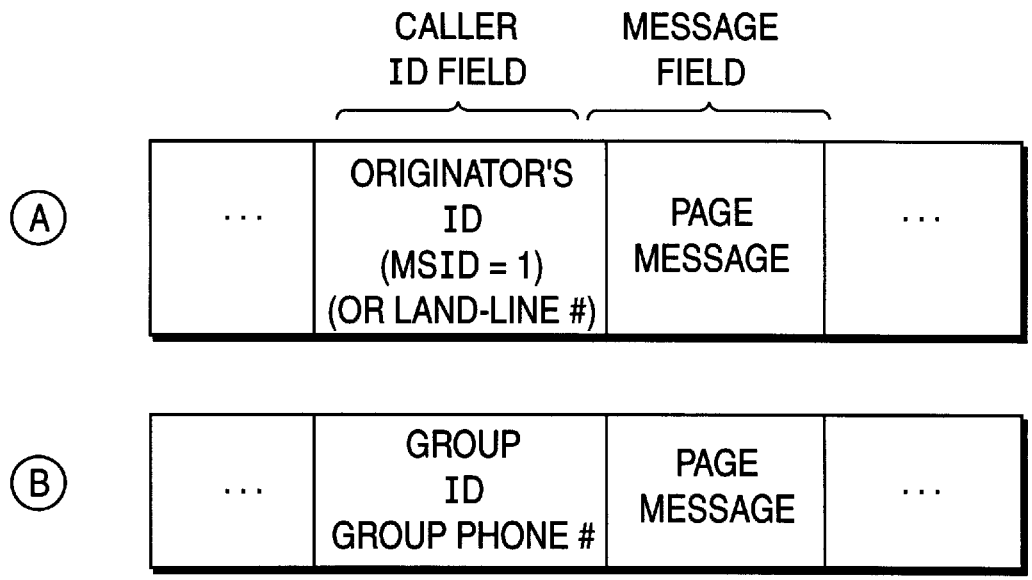
FIG. 4 is a set of messages transmitted in accordance with an example embodiment of FIG. 3 in an example abbreviated format.
FIG. 5 is an example lookup-table employed by the group ID server in the example embodiment of FIG. 3.

In FIG. 3, an originating phone 20, which may be a land-line phone or which may be a mobile phone having assigned to it a mobile station identification number of "MSID=1," initiates a group call to a group of mobile stations identified by the group number "group=10." The originating phone 20 begins this call procedure by sending a page, such as is partially shown in frame A of FIG. 4. The originating phone 20 prepares frame A, which those of ordinary skill in the art will understand to be an abbreviated version of the contents of a traditional page frame from a standard cellular transmission, in which the caller id field contains within it the originating phone 20 ID (in this case MSID=1), together with a page message in the message field. Of course, included within this frame will be the message to the mobile station switching center 13 indicating to the center that the originating phone 20 is dialing a group number as the "phone number."

The mobile radio switching center 13 recognizes the phone number "10" as a group number and switches the page request to a group ID server 21. In essence, the mobile radio switching center 13 simply passes on the "dial group number 10" request from the originating phone 20 to the group ID server 21.

The group ID server 21 goes to a lookup-table of group numbers, an example of which is shown in FIG. 5. This lookup-table may be stored in memory within the group ID server 21 as it contains co-relations between MSID group numbers and the cellular telephones associated with these particular groups. For example, in FIG. 5, the group No. 10 (which is, in the example of FIG. 3, the group number that originating phone 20 has requested) contains MSID group numbers (cellular phones) identified by MSID Nos. 2, 3, and 4 and group number (land-line phone) identified by LL=5. Similarly, group No. 11 contains MSID group Nos. 2, 7, and 8. The present invention is not limited to any particular number of MSID or land-line group numbers loaded into group ID server 21, nor any particular arrangement of number of group members associated with any or all group numbers.

After looking up the group No. 10 and finding that its associated MSID and land-line group members are identified by mobile station ID's 2, 3, and 4 and land-line ID no. 5, the group ID server 21 informs the mobile radio switching center 13 that mobile stations identified by MSID Nos. 2, 3, and 4 and land-line phone identified by LL=5 are to be called. Thus, as shown in FIG. 3, group ID server 21 asks mobile radio switching center 13 to "dial MSID=2, 3, and 4 and LL=5."

Before sending the dial request to the mobile radio switching center 13, however, the group ID server 21 makes a change to the caller ID field of the frame provided to it by the originating phone 20, as shown in FIG. 4, Frame B. As FIG. 4 illustrates, the group ID server 21 receives Frame A and modifies the caller ID field by replacing the originator's ID (MSID=1) to the requested group ID (group=10). In essence, the originating phone 20 is informing the mobile radio switching center 13 that its identity is MSID=1 and that it requests a dispatch-type call to the group identified by group=10. This is relayed to group ID server 21, which translates the phone number "group=10" into a set of MSID's and LL's associated with the respective mobile stations located within group "10." Then, instead of identifying the caller as the originating phone 20, the group ID server 21 identifies to the destination mobile stations and land-line phones that the call is a group call for the group identified as "group=10," of which each of the respective mobile stations and land-line phones identified by MSID=2, 3, and 4 and LL=5 are a part.

As shown in FIG. 3, the mobile radio switching center 13 completes the connections for the "group 10"mobile stations, namely mobile stations 22, 23, 24 and LL5. Note that mobile station 25 (MSID=5) is not connected to the group call because, as shown in FIG. 5, MSID=4 is not included in the Group No. 10, which originating phone 20 originally requested. Rather, the connection that is made by MSC 13 between originating phone 20 and mobile station 22 (MSID=2), mobile station 23 (MSID=3), mobile station 24 (MSID=4) and land-line phone 5 (LL=5) is a dedicated channel connection between those phones such that the originating phone 20 can now broadcast a message exclusively to mobile stations 22–24 and phone LL5.

Of course the mobile stations 22–24 and phone LL5 receive the Frame B of FIG. 4 from the mobile radio switching center 13 with a caller ID field identifying the caller as group 10. In order to allow the phones 22–24 and LL5 to operate as dispatch radios, with hands-free operation, they must understand that they are receiving a group call, as opposed to a standard one-on-one phone call. For this reason, each of the phones is equipped with EEPROM that can be loaded with phone numbers identifying groups, as opposed to individual pre-stored numbers. In the example of FIG. 6, the EEPROM is capable of loading ten group numbers in the first ten address locations of the EEPROM. Thereafter, additional phone numbers, such as pre-stored speed dial numbers, can be loaded into the memory. With this arrangement, each time a phone receives a page request, it will look to the EEPROM in the first ten addresses to first determine whether the caller ID is one of the ten pre-stored group numbers. If the match occurs, the phone will enter an auto answer mode since it will have recognized the group number as one in which the phone is to respond in a dispatch-type operation. In order to override the dispatch-type operation, the phone can be equipped with a push-to-talk (PTT) button which will unmute the cellular phone microphone from its otherwise muted condition that occurs in the auto answer, dispatch-type operation.

Thus, the first ten addresses of the memory map of FIG. 6 identify originating group numbers that will cause the phone to auto answer. Of course, more or less than ten memory locations can be employed. Also, although the auto answer numbers are segregated from the pre-stored numbers, in the embodiment of FIG. 6, by separating them into the first ten address locations, the present invention is not limited to any particular type of segregation plan provided the phone can identify auto answer group numbers from other pre-stored phone numbers.

Note that a normal caller id identification system can still be employed with the present invention. Consider, for example, the embodiment of FIG. 3 in which the originating phone 20 asks the mobile radio servicing center 13 to "dial MSID=3" instead of the "dial group=10" instructions shown. In essence, this alternative request is a request by the originating phone 20 to be connected directly (one-on-one) with the cellular phone identified by mobile station ID 3 (i.e., mobile station 23). This is, of course, a standard cellular phone call in which one cellular phone (although phone 20 can be a land-line phone in this example) dials the telephone number of another cellular phone (although phone 23 can be replaced by a land-line phone in this example), which phone number is translated into the mobile station ID for the destination mobile station 23. In this instance, the originating phone 20 sends the Frame A of FIG. 4, in the usual manner, to the mobile radio servicing center 13, which recognizes the mobile station ID as a single cellular phone (as opposed to a group number) and sends on the page request to mobile station 23. In this case, mobile stations 22, 24 and 25 and land-line phone no. 5 will not receive the page requests since it is destined only for a single recipient, namely mobile station 23.

In such a case, mobile station 23 will receive the Frame A identifying, in the caller id field, the originator's ID, which in this case is the originating phone 20 ID of MSID=1. That is, the group ID server 21 is not employed in the one-to-one cellular communication and thus does not convert the caller id Frame of FIG. 4 from Frame A to Frame B. Thus, mobile station 23 receives the Frame A identifying the caller as originating phone 20 having MSID=1 and can check its EEPROM, such as is shown in FIG. 6, in its pre-stored number addresses to determine whether the originating phone is pre-stored in its memory. If so, the pre-stored phone number from the originating phone 20 can have associated with it an alpha message (such as "John's work") which the mobile station 23 can send to the display on the front of the cellular phone to identify to the user who is attempting to complete the call. The user can then choose whether to answer the phone based on the alpha message identified on the display.

Thus, the mobile stations and land-line phones will include a memory map, an example of which is shown in FIG. 6, which allow them to identify whether a call is originating from a group request versus a one-to-one communication. In either case, the phone can identify by an alpha message to the user who is making the call (such as "group 10" or "John's work"). But, in the case of the caller ID identifying to the phone that the call is a group request, the appropriate phones 22–25, etc. in the requested group will auto answer the call, turn on the speaker at an appropriate volume, and connect the call through, such that the specified phones can then broadcast the originating phone user's discussion directly to the user of the phones, without the users of the phones having to push any buttons or "answer" the call themselves.

Figure 7:
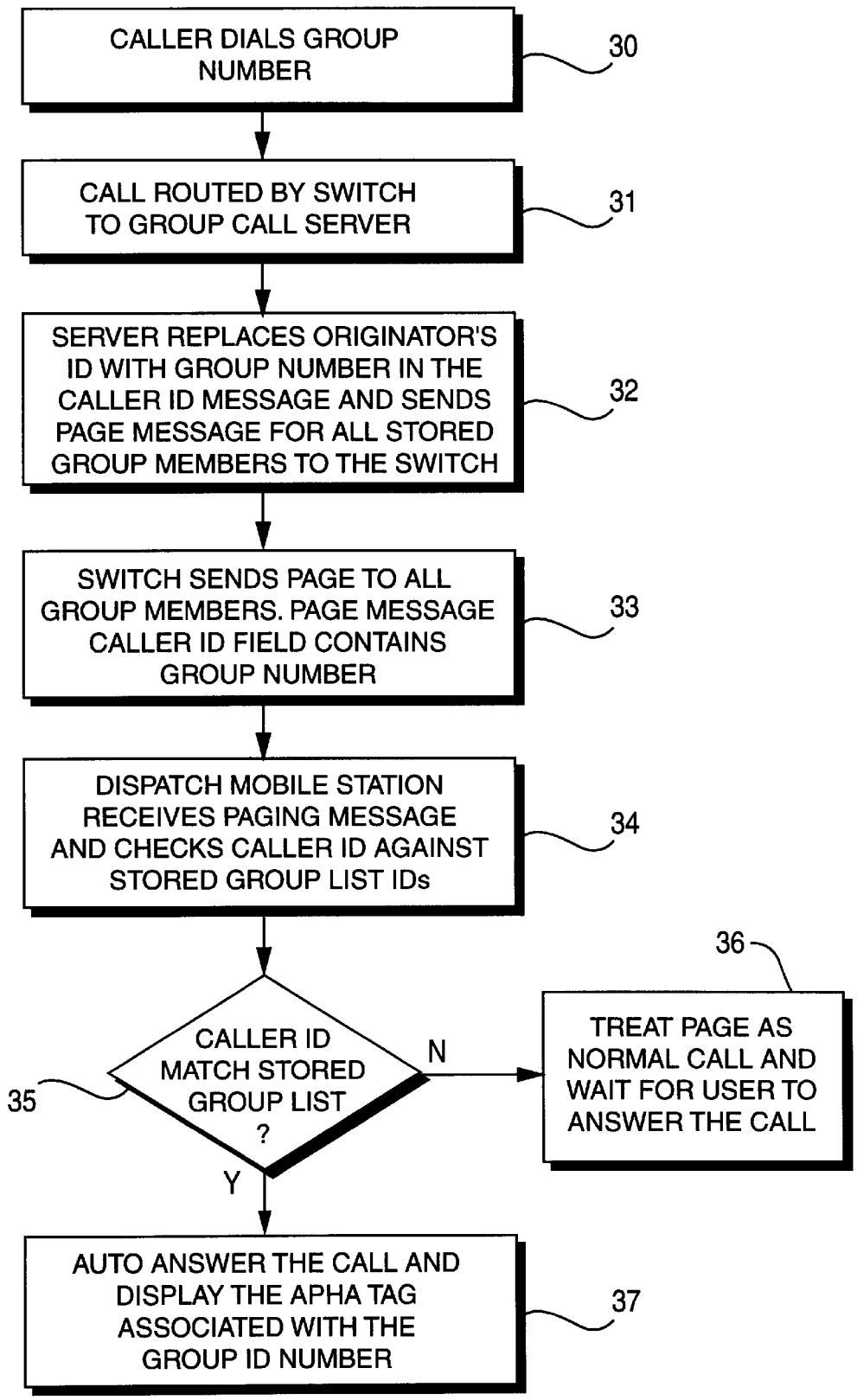
FIG. 7 is a flowchart in accordance with an example embodiment of the present invention.

FIG. 7 illustrates a flowchart of the steps employed by an example embodiment of the present invention. In step 30, the caller dials a group number, such as the originating phone 20 (FIG. 3) dialing the group number "group=10." The call is received by a switch (MSC 13), which routes the group call request to the group call server (group ID server 21) at step 31. The group ID server 21 then replaces the originating phone 20 ID (in the case of FIG. 3, MSID=1) with the group number requested by the originating phone 20 at step 32. This replacement occurs in the caller id message field, as shown in FIG. 4. Once the group ID server 21 has made this caller id field replacement, it sends the page request to the switch, with a destination identified by each of the specific group members.

At step 33, the switch receives the page request from the group ID server 21 and sends the page to each of the group members individually. The mobile stations 22–24 and land-line phone LL=5 then receive this paging message from the switch 13 at step 34 and check the caller id field of FIG. 4 against their stored group list ID's of FIG. 6. If the recipient phones detect a matched condition at step 35, they will answer the call and display an alpha tag (alpha message) associated with the group ID number (such as the group ID number itself or a word or phrase associated with the particular group) at step 37. If this matched condition is detected, the mobile stations 22–24 and land-line phone LL5 ring once, then send a connect signal to the switch 13 and enable the phone to receive the call, without requiring any hands-on operation of the user. If, on the other hand, at step 35, the matched condition is not detected, the call is treated by the switch and recipient phone as a normal call, which requires the user to unhook the land-line phone or push a button on the cellular phone, or take some other action, to "answer" the call at step 36.

As one can see from a study of the present example embodiment, the present invention allows a cellular phone user to employ the cellular phone in either a normal, human-answering mode in which the user must take some hands-on action to answer a call or can be employed in an auto answer mode in which the cellular phone acts as a dispatch radio for broadcasting messages from an originator to a group of cellular phones.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of connecting a phone call from an originating phone having an originating phone identifier to a group of phones each having a destination phone identifier and collectively having a group phone identifier, the originating phone identifier being contained in a caller id field of a call request issued by the originating phone, the method comprising the steps of:

receiving the associated group phone identifier at a group call server;

removing the originating phone identifier from the caller id field;

writing the group phone identifier into the caller id field;

identifying the destination phone identifiers for each of the phones in the group of phones based on the associated group phone identifier received by the group call server;

issuing routing instructions from the group call server to a radio switch identifying each of the destination phone identifiers for each phone in the group of phones;

receiving the routing instructions from the group call server and routing a page request including the caller id field with the group phone identifier to each phone in the group of phones;

receiving the page request;

reading the group phone identifier from the caller id field; and looking up the group phone identifier in a group identifier lookup table.

2. A method according to claim 1, wherein the group of phones is a group including at least one cellular phone.

3. A method according to claim 1, further including the step of:

looking up the destination phone identifiers in a memory lookup table.

4. A method according to claim 1, further including:

if a match between the group phone identifier from the caller id field and a group phone identifier in the group identifier lookup table is identified, automatically answering the phone call from the originating phone.

5. A method according to claim 4, wherein the automatic answering occurs at a phone in the group of phones having a microphone, the method further including:

muting the microphone.

6. A method according to claim 5, further including:

aerially broadcasting the phone call through the phone having the microphone.

7. A group call server system, comprising:

a communication link to receive a group call request from an originating phone having a caller id field with information identifying the originating phone;

a call processor to remove the information identifying the originating phone from the caller id field, to place group information identifying the group call request into the caller id field a memory lookup table to store group information together with destination phone identifiers corresponding to the respective group information, the processor also to look up a set of destination phones corresponding to the group call request and transmit via the communication link destination phone identifiers for each of the destination phones, together with the caller id field containing the group information; and at least one destination phone to receive the group information, to compare the group information to a group identifier lookup table, and to automatically answer the phone call from the originating phone if the group information matches information from the group identifier lookup table.

8. A method of connecting a cellular phone to a call originating from an originating phone having a caller id feature, comprising the steps of:

1) storing group call identifiers in a memory at first pre-designated memory locations;

2) storing originator phone call identifiers in the memory at second pre-designated memory locations;

3) receiving a page request from the originating phone;

4) reading a caller id field of the page request;

5) comparing the contents of the caller id field with one of the first pre-designated memory locations; and repeating this comparison with next pre-designated memory locations until the earlier of steps 6a) and 6b) occur:

6a) the caller id field is determined to match one of the first pre-designated memory locations, and the call from the originating phone is automatically answered by the cellular phone; and 6b) the caller id field is compared to all of the first pre-designated memory locations and no match is determined, and the cellular phone awaits a user input to answer the call from the originating phone.

9. A method according to claim 8, wherein step 6a) further includes the steps of:

muting a microphone associated with the cellular phone; and aerially broadcasting the call from the originating phone through the cellular phone.

10. A method of connecting a phone call from an originating phone having an originating phone identifier to a destination phone having a destination phone identifier, the originating phone identifier being contained in a caller id field of a call request issued by the originating phone, the method comprising the steps of:

receiving the associated phone identifier at a call server;

removing the originating phone identifier from the caller id field;

writing the destination phone identifier into the caller id field;

identifying the destination phone based on the destination phone identifier in the caller id field;

issuing routing instructions from the call server to a radio switch identifying the destination phone identifier for the destination phone;

receiving the routing instructions from the call server and routing a page request including the caller id field with the destination phone identifier to the destination phone;

receiving the page request;

reading the destination phone identifier from the caller id field;

looking up the destination phone identifier in a group destination lookup table; and if a match between the destination phone identifier from the caller id field and a destination phone identifier in the destination identifier lookup table is identified, automatically answering the phone call from the originating phone.

11. A method according to claim 10, wherein the destination phone is a cellular phone.

12. A method according to claim 10, further including the step of:

looking up the destination phone identifier in a memory lookup table.

13. A method according to claim 10, wherein the automatic answering occurs at a destination phone having a microphone, the method further including:

muting the microphone.

14. A method according to claim 13, further including:

aerially broadcasting the phone call through the destination phone having the microphone.

* * * * *